United States Patent [19]

Gozion et al.

[11] 4,285,617
[45] Aug. 25, 1981

[54] DUCT AND FLOP-GATE CONSTRUCTION AND METHOD OF HANDLING DUST OR OTHER PARTICULATE MATERIAL

[76] Inventors: Mark Gozion, 570 Richland Rd., Pittsburgh, Pa. 15228; H. Mark Hall 2453 Saddle Dr., Allison Park, Pa. 15101

[21] Appl. No.: 106,626

[22] Filed: Dec. 26, 1979

[51] Int. Cl.³ .............................................. B65G 53/56
[52] U.S. Cl. ................................. 406/171; 193/31 R; 406/183
[58] Field of Search ................. 406/84, 155, 156, 183, 406/181, 168, 171, 173; 193/31 R, 31 A; 406/117; 15/300 R, 301

[56] References Cited

U.S. PATENT DOCUMENTS

| 304,259 | 8/1884 | Brunton | 193/31 A X |
|---|---|---|---|
| 644,855 | 3/1900 | Forster | 406/168 X |
| 824,945 | 7/1906 | Miller | 406/183 |
| 1,029,532 | 6/1912 | Day | 406/117 X |
| 1,048,477 | 12/1912 | Allington | 406/117 |
| 1,676,969 | 7/1928 | Sutton et al. | 15/301 X |
| 2,276,805 | 3/1942 | Tolman | 406/172 |
| 2,605,076 | 7/1952 | Tanke | 193/31 R X |
| 3,236,565 | 2/1966 | Kester et al. | 406/173 |
| 3,491,518 | 1/1970 | Williams | 406/171 X |

Primary Examiner—James L. Rowland
Attorney, Agent, or Firm—William A. Danchuk; John F. Carney

[57] ABSTRACT

A duct and flop-gate construction for handling particulate material and a method of handling dust or other particulate material. The collected material drops down a duct which contains a flop-gate for directing the material to either of two bins. A mild current of air is drawn upwardly through the duct and flop-gate counter to the movement of the material to subject the bins to negative pressure and prevent outward leakage. The same duct serves both to carry material downwardly to the bins and as a means for applying negative pressure to the bins.

3 Claims, 4 Drawing Figures

DUCT AND FLOP-GATE CONSTRUCTION AND METHOD OF HANDLING DUST OR OTHER PARTICULATE MATERIAL

This invention relates to an improved duct and flop-gate construction and to an improved method of handling dust or other particulate material.

Our duct and flop-gate construction is particularly useful as applied to a dust collecting system in which dust is picked up from a source, such as a coal-carrying conveyor, and received in either of two bins. Typically the system includes a bag house into which dust is drawn and gathered on fabric filters. Periodically the filters are shaken to dislodge the dust, which drops down a duct to one of the bins. The two bins are subjected to a negative pressure which prevents dust or gases from leaking out. Nevertheless it is apparent our invention may have broader appplication where similar problems are encountered.

An object of our invention is to provide an improved duct and flop-gate construction which enables a single duct to serve both for carrying particulate material to either of two bins and as a means through which negative pressure is applied to the two bins.

A more specific object is to provide an improved duct and flop-gate construction which includes a two-way duct for carrying particulate material downwardly and a flop-gate pivoted within the duct for directing such material to either of two bins, but being open to permit upward flow of air, whereby the duct serves also as a means through which negative pressure is applied to both bins.

A further object is to provide an improved method of handling dust or other particulate material in which we transport collected particulate material through a duct to either of two bins and apply negative pressure to both bins through the same duct.

Figure 1:
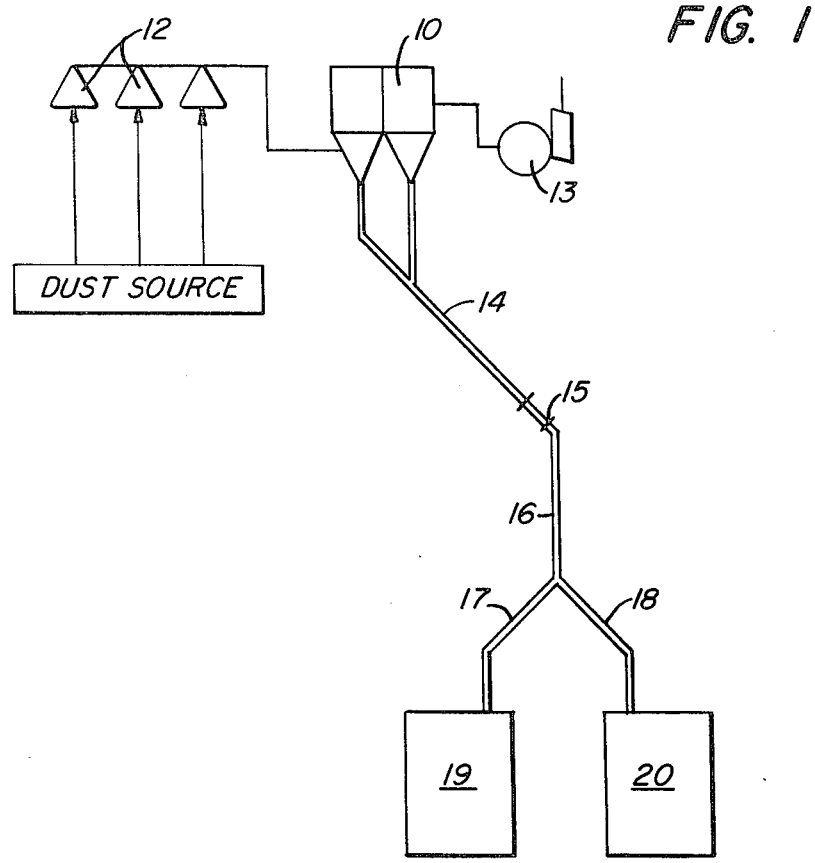
FIG. 1 is a schematic diagram of a dust-collecting system which embodies our duct and flop-gate construction.

FIG. 1 shows schematically by way of example a dust-collecting system which includes a bag house 10 and a plurality of pickups 12 connected to the bag house. The pickups are located over a dust source such as the discharge end of a coal-carrying conveyor. An exhaust fan 13 is connected to the bag house for applying a strong suction to the pickups and drawing dust-laden air into the bag house, where the dust gathers on fabric filters. Dust dislodged from the filters drops downwardly through ductwork which includes in series an uppermost duct 14 of circular cross section, a transition duct 15, and a duct 16 of rectangular cross section constructed in accordance with our invention. At its lower end duct 16 connects with two branches 17 and 18 which lead to two dust-receiving bins 19 and 20 respectively. As hereinafter described, dust which drops into the ductwork may be directed to either bin. The individual components of the system, apart from our improved duct 16, may be of conventional construction and are not shown in detail.

Figure 3:
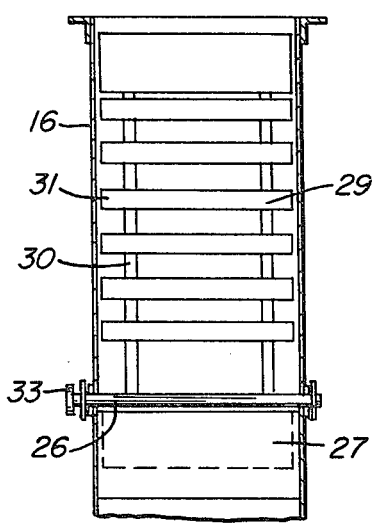
FIG. 3 is a vertical sectional view of our construction taken at right angles to FIG. 2 on line III—III.
Figure 4:
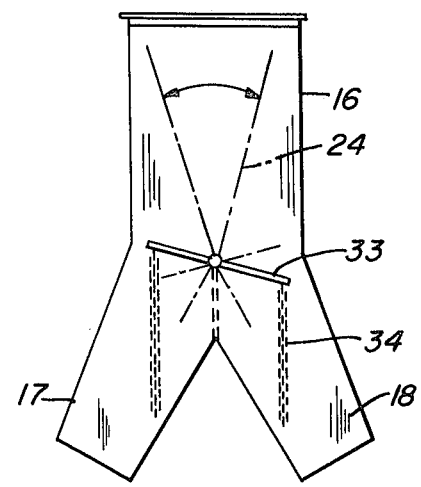
FIG. 4 is a fragmentary side elevational view of the duct and operating mechanism for the flop-gate.
Figure 2:
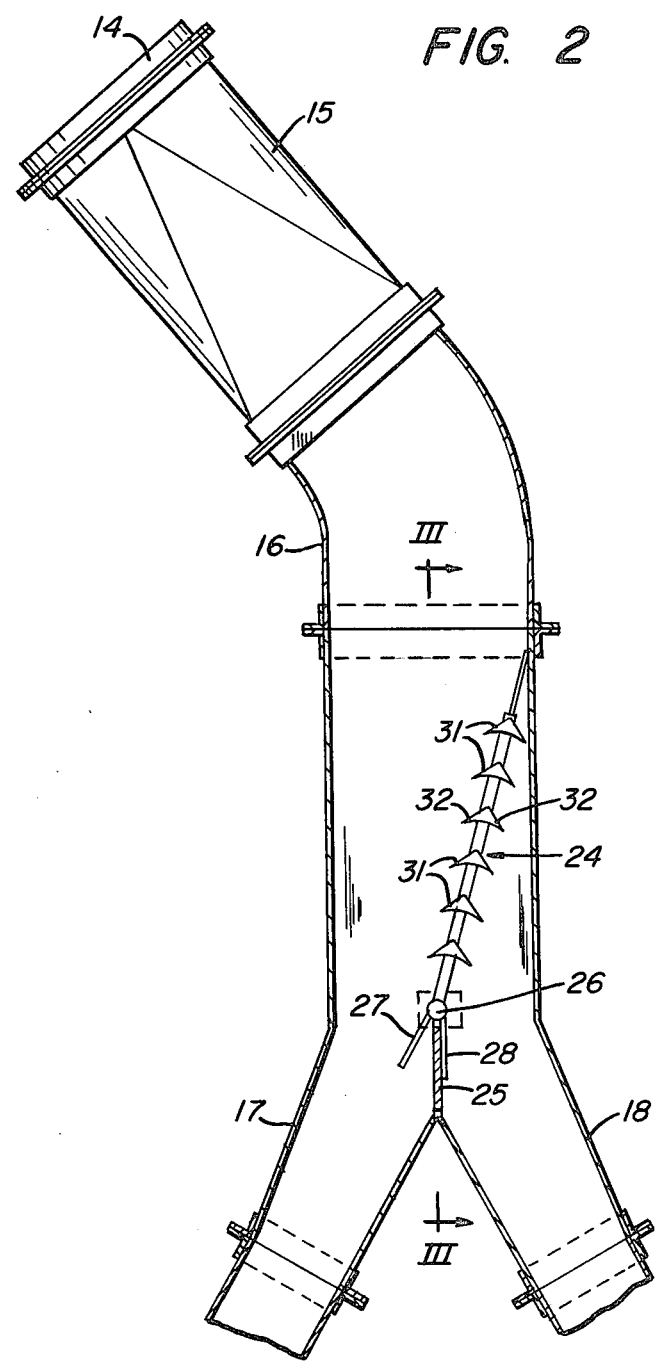
FIG. 2 is a vertical sectional view of our duct and flop-gate construction.

FIGS. 2 and 3 show our improved duct and flop-gate construction in more detail. A flop-gate 24 is pivoted near its lower end on a horizontal axis near the lower end of the duct 16. The duct has an internal wall 25 which extends upwardly from the juncture of the two branches 17 and 18 to the proximity of the pivotal axis. The flop-gate includes a shaft 26, a pair of downwardly extending angularly related plates 27 and 28 fixed to the shaft, and a pair of spaced-apart upwardly extending arms 29 and 30 also fixed to the shaft. A plurality of spaced-apart baffles 31 extend between the arms and are fixed thereto. Each baffle has a pair of upper faces 32 which slope downwardly in opposite directions from the arms 29 and 30. The baffles are relatively narrow, each being of a width less than half the width of the duct. Externally of the duct, the shaft 26 carries an operating lever 33 shown in FIG. 4. Preferably the operating lever carries depending chains 34 at each end which are accessible for shifting the flop-gate.

FIG. 2 shows the flop-gate 24 leaning toward the right wall of duct 16 to direct material to the left branch 17 and bin 19. The baffles 31 lie within the right half of the duct and intercept any material dropping down the right half and divert such material to the left. The flop-gate can be shifted to lean toward the left wall of the duct to direct material to the right branch 18, and the action is reversed but otherwise similar.

The fan 13 draws a mild current of air upwardly through the duct 16. The air passes through the open spaces in the flop-gate 24 between baffles 31. Thus the bins are subjected to a negative pressure which prevents dust and gases from leaking out. In the example of coal dust, the gases may contain methane. The negative pressure is only a little below atmospheric and the air velocity is low in order not to pick up any significant quantity of dust from the bins nor to impede downward movement of dust through the duct. The angle between plates 27 and 28 preferably is about 15° and each plate is dimensioned to present a flow area restriction in each branch corresponding substantially to the amount of flow area restriction presented by baffles 31. In the position shown in FIG. 2, the right plate 28 abuts the wall 25 and the left plate 27 extends over the edge of the left branch 17. Thus the plate sets the area of oepning through which air can flow upwardly from the left bin and balances the flow of air.

According to our method of handling dust or other particulate material, material which has gathered on a filter or the like is dislodged periodically and drops through the two-way duct. The flop-gate within the duct directs the material to either of two bins. A mild current of air is drawn upwardly through the duct and subjects the two bins to a negative pressure only a little below atmospheric. The negative pressure prevents particulate material and gas from leaking outwardly from the bin. The flop-gate is largely open to permit upward flow of air through the duct counter to movement of material.

From the foregoing description, it is seen that our invention affords a simple construction and method which enable a single duct to serve both to direct particulate material to either of two bins and as a means through which negative pressure is applied to the two bins. In the absence of our invention, duplicate ductwork is needed and adds substantially to the cost.

We claim:

1. In a system in which a dust-particulate mixture is filtered in a bag house, or the like, and the separated particulate material is conducted for discharge alternately to each one of a pair of receptacles, said system including duct means extending between the discharge side of said bag house and said receptacles and containing a bifurcate portion having a pair of branches each of which is connected with the inlet to one of said receptacles, fan means for inducing an air flow through said duct means counter to the direction of particulate flow therethrough for partially evacuating said system, and means for directing particle flow alternately to the respective ones of said receptacles without disrupting the partial evacuation of air therefrom, comprising:

(a) a flop-gate having a frame, a plurality of mutually spaced baffles carried by said frame, said baffles being of a length to traverse the width of the interior of the respective duct branches and each having a pair of particle-deflecting surfaces divergent in the direction of flow of particulate material through said duct, (b) a shaft connecting said frame to the juncture of said branches in said duct means for pivotal movement between each of said branches, and (c) plate means mounted on said shaft for pivotal movement with respect to said duct means and effective to restrict the flow area of the other of said branches traversed by said frame.

2. The system defined in claim 1 in which said plate means comprise a plate operative in each of the respective branches, said plate being dimensioned to restrict the flow area of the respective branches by an amount corresponding substantially to the restriction in flow area presented by said baffles.

3. The system defined in claim 2 in which said duct means has a wall upstanding from the juncture of said branches, a pair of plates affixed to said shaft and extending oppositely of said frame, each of said plates being operative in one of said branches, and said plates being angularly related with respect to one another to dispose that plate in the branch traversed by said frame in abutment with said wall and the other of said plates in flow restricting disposition in the other of said branches.

* * * * *